United States Patent [19]

Suwa et al.

[11] Patent Number: 5,043,915
[45] Date of Patent: Aug. 27, 1991

[54] KNOWLEDGE-BASED SYSTEM INSTALLED WITH ASSOCIATIVE KNOWLEDGE AND INFERENCE METHOD

[75] Inventors: Masaki Suwa, Kokubunji; Hiroshi Motoda, Mito, both of Japan

[73] Assignee: Hitachi, Ltd., Tokyo, Japan

[21] Appl. No.: 442,212

[22] Filed: Nov. 28, 1989

[30] Foreign Application Priority Data

Nov. 30, 1988 [JP] Japan ................................. 63-300492

[51] Int. Cl.⁵ ............................................. G06F 15/18
[52] U.S. Cl. .................................................... 384/513
[58] Field of Search ........................................ 364/513

[56] References Cited

U.S. PATENT DOCUMENTS 4,999,833 3/1991 Lee ................................. 364/513 X

OTHER PUBLICATIONS

Explanation Based Generalization: A Unifying View; Machine Learning 1: 47–80, 1986; Mitchell, Keller, and Kedar-Cabelli.

*Primary Examiner*—Allen R. MacDonald
*Attorney, Agent, or Firm*—Antonelli, Terry, Stout & Kraus

[57] ABSTRACT

An inference system provided with a first knowledge base for storing general knowledge which is a theorem, and a second knowledge base for storing associative knowledge which is different in knowledge structure from the above mentioned general knowledge. The associative knowledge is automatically generated from the comparison between a first proof tree where inferences have ended in failure and a second proof tree where inferences have ended in success, if inferences have ended in success by the help of information about a suggestion appended additionally when the first inferences of a problem stopped, and the associative knowledge generated will be stored in the second knowledge base thereafter. The associative knowledge includes a if-part which describes the conditions to be focused on a then-part which includes the description of the relation between the above mentioned condition to be focused on and the other additional conditions to be associated with and the description of the information holding on the basis of the above-mentioned relation.

10 Claims, 16 Drawing Sheets

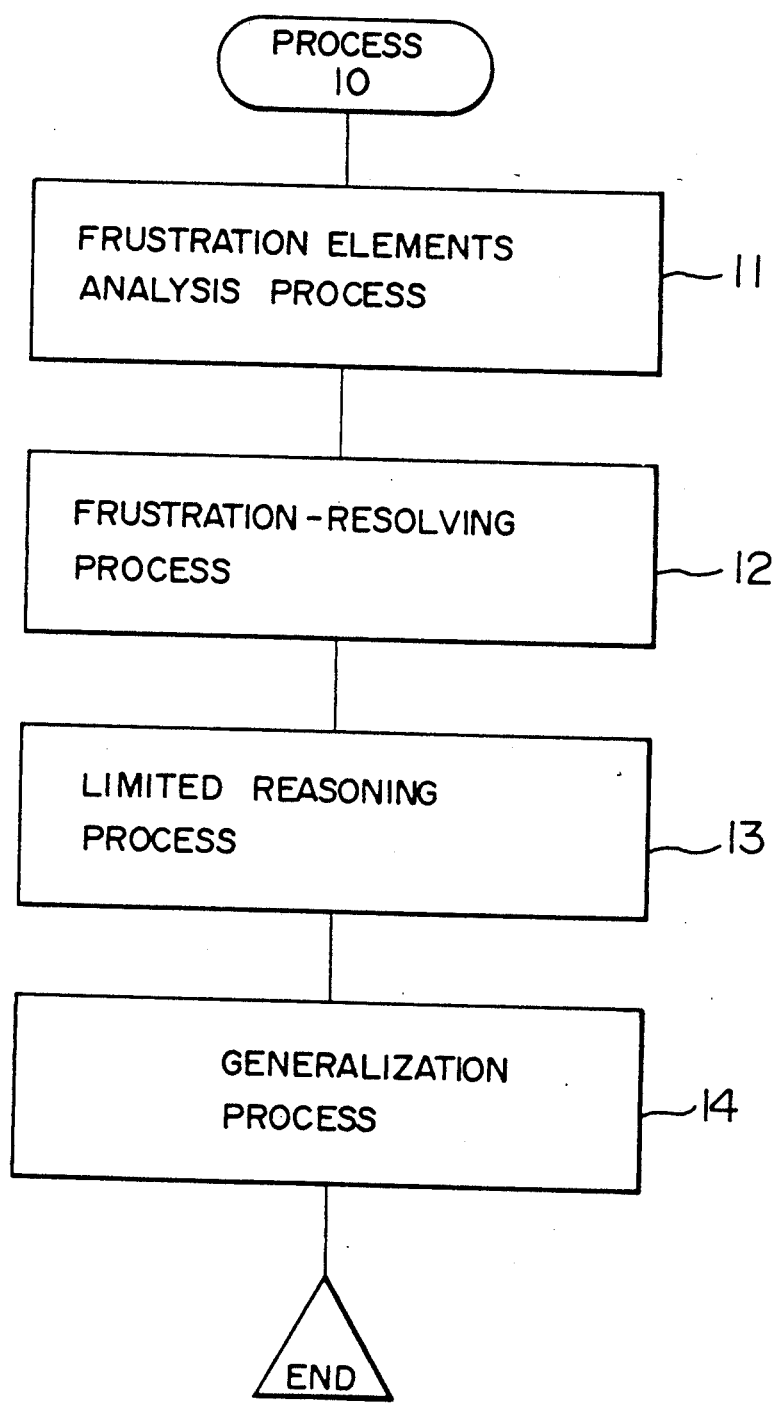

BD = CD
AB = EC

⇓

∠BAD = ∠CED

BP = CP
AB = CD
AQ = QD

⇓

AQ = AR

F I G. 8

| IF | line((X,Y,Z)), line((W,Y,V)) | |
|---|---|---|
| THEN | equal(ang(X,Y,W), ang(Z,Y,V)) | K1 |

| IF | equal(ang(X,Y,Z), ang(X,Z,Y)) | |
|---|---|---|
| THEN | equal(seg(X,Y), seg(X,Z)) | K2 |

| IF | equal(X,Y), equal(Y,Z) | |
|---|---|---|
| THEN | equal(X,Z) | K3 |

| IF | congruent(tri(X1,Y1,Z1), tri(X2,Y2,Z2)) | |
|---|---|---|
| THEN | equal(ang(X1,Y1,Z1), ang(X2,Y2,Z2)) | K4 |

FIG. 11
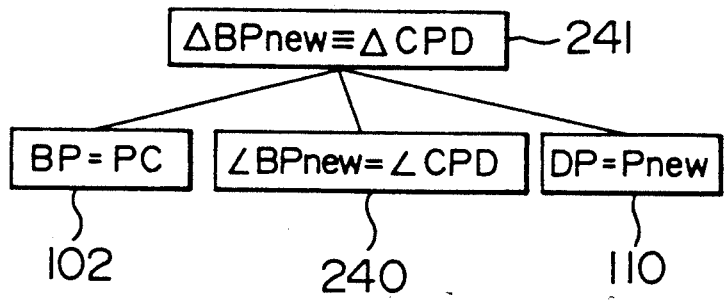
FIG. 12A
point(b), point(p),
point(c), point(d),
point(new), line((b,p,c)), line((d,p,new)),
line((b,new)), line((c,d))
FIG. 12B
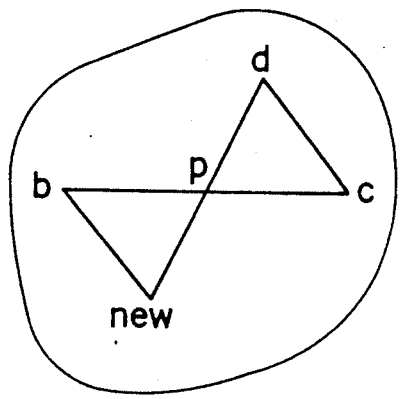

F I G. 15A

S1

IF ?-condition(equal(seg(X,Y),seg(Y,Z))). —— 102
Then?-make-pattern(p1(X,Y,Z,W,V)).
Where make-pattern(p1(X,Y,Z,W,V)):-
(point(X), point(Y), point(Z), point(W),
point(V), equal(seg(X,Y),seg(Y,Z)),
line((X,Y,Z)), equal(seg(V,Y),seg(Y,W)),
line((V,Y,W)), line((X,V)), line((W,Z))) →
($congruent(tri(X,Y,V), tri(Z,Y,W))), —— 243'
$equal(ang(X,Y,V), ang(Z,Y,W)), —— 242'
$equal(ang(V,X,Y), ang(W,Z,Y)), —— 353'
$equal(ang(X,V,Y), ang(Z,W,Y)), —— 352'
$equal(seg(X,V), seg(Z,W), —— 351'
$parallel(line(X,V), line(W,Z))). —— 354'

F I G. 15B

IF ?-condition(equal(seg(X,Y),seg(Z,W))). —103
Then ?-make-pattern(p2(X,Y,Z,W,V)).
Where make-pattern(p2,(X,Y,Z,W,V)):-
    (point(X), point(Y), point(Z), point(W),
    point(V), equal(seg(X,Y), seg(Z,W)),
    equal(seg(X,Y), seg(W,V), line((X,Y)),
    line((Z,W)), line((W,V)), line((Z,V))) —
    ($equal(seg(Z,W), seg(V,W)),
    $equal(ang(W,Z,V), ang(W,V,Z))).

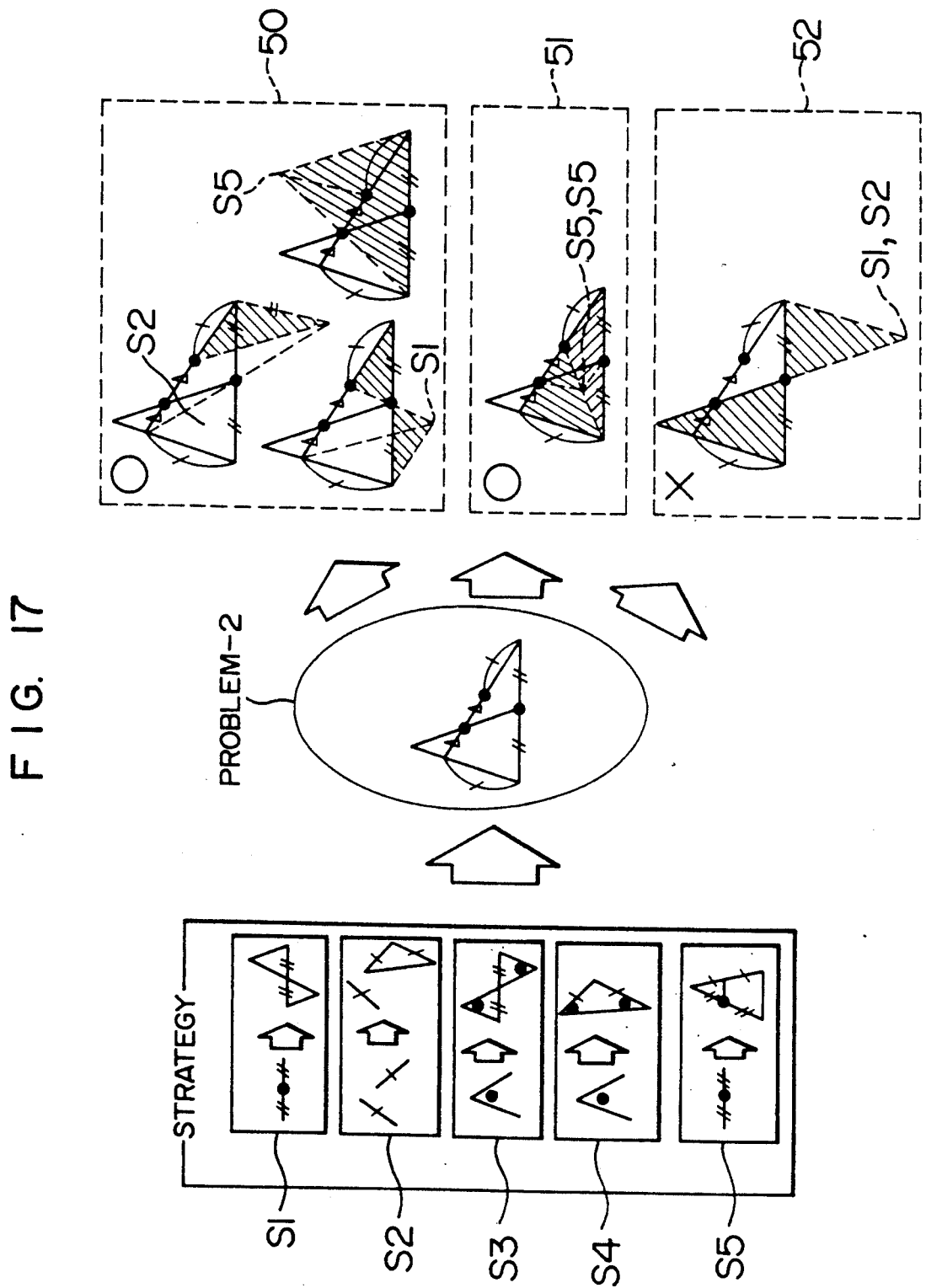

KNOWLEDGE-BASED SYSTEM INSTALLED WITH ASSOCIATIVE KNOWLEDGE AND INFERENCE METHOD

BACKGROUND OF THE INVENTION (1) Field of the Invention

This invention relates to an inference method and a knowledge-based system, and more particularly relates to those which learn associative knowledge from experience and are suited to use the learned knowledge in new problem solving.

(2) Description of the Related Art

It is necessary to collect all pieces of the knowledge required for problem solving in order for a knowledge-based system to function effectively. Almost all of the existing knowledge-based system need the knowledge to be elicited and provided by domain expert. While solving a problem we human beings are capable of learning strategic knowledge which is useful to solve a new problem and thus acquiring new knowledge. We often experience that by making association to our past experience and we become able to derive a solution to a problem which we could not at first by near use of the knowledge we had before.

There is a long history of machine learning. Inductive learning from examples have been popular in the past. However, since human beings learn more effectively the more background knowledge they have it has become recognized that learning from scratch is unrealistic and the recent main stream is a deductive learning in which domain theory is given as general knowledge and how it is used is learned. This approach is called Explanation-Based Learning or Explanation-Based Generalization, as described, for example in "Explanation-Based Generalization: A unifying view" by T. M. Mitchell et al, in Machine Learning Vol. 1, No. 1, pp 47-80, 1986 published by Kluwer Academic Publishers in England. This is a method which reflects human beings' characteristics that they analyze why a given solution to a problem can be a solution to the problem and apply the results of the analysis to a new problem.

However, this method works well only if a new problem can be solved by applying the whole solution mechanism of the problem experienced in the past. In fact, many of the problems encountered in daily life are ones which we feel somewhat similar to those experienced in the past. Invention of a learning method that can cope with those situations is strongly desired.

SUMMARY OF THE INVENTION

As is evident from the above discussion, it is impossible to learn, inspired by some hint, an effective use of a domain theory for an inexperienced problem which looks similar but is not exactly the same to what has been experienced before.

It is an object of the present invention to provide a novel knowledge-based system which solves the above problem.

Another object of the present invention is to provide a knowledge-based or an inference system with enhanced inference capability.

A further object of the present invention is to provide a novel knowledge structure which is different from existing ones and which improves the capability of an inference system, and its generation method.

Still a further object of the present invention is to provide an inference method and system which execute inferences using a plurality of knowledge bases of different knowledge structures.

In order to achieve the above objectives, the inference system (knowledge-based system) according to the present invention uses two different kinds of knowledge-bases: the first knowledge-base (KB) in which general knowledge in a problem space domain is stored and the second knowledge-base (KB) in which associative knowledge, which is applied when the inference comes to a deadlock in case only the former knowledge is used, is stored.

The aforementioned general knowledge comprises if-part which describes at least one conditional equation or conditional element and then-part which describes fact(s) or conditional equation(s) which hold for the object that satisfies the if-part. On the other hand, the aforementioned associative knowledge includes an if-part which describes at least one conditional equation or conditional element and a then-part which describes fact(s) or conditional equation(s) which hold for the environment in which at least one auxiliary conditional equation or conditional element which is different from that described in the if-part is satisfied.

When a problem to be solved is given by an operator through an input device, inference is initiated and processed by an inference engine (data processing device) using the knowledge in the aforementioned two kinds of knowledge-bases; first KB and second KB.

The problem can be given by specifying all the conditions that hold for the problem and/or a goal to be proved. Inference can be made either in a forward direction or a backward direction. The inference engine, when it is given either of the problem conditions and the goal, performs an inference from only the given problem elements. And when it is given both the conditions and the goal, it tries to verify that the goal really holds on the basis that the conditions are holding. The system asks an operator for instructions such as addition of new conditions in case the inference gets stuck and the given goal cannot be proven from the given initial conditions using all the knowledge in the knowledge-bases; first KB and second KB. When the stuck phenomenon is resolved by the instructions the inference engine executes a process (learning process) to analyze why the stuck phenomenon has been resolved. In this learning process the first inference path (proof tree) of the failed inference process before the instructions are given is compared with the second inference path of the successful inference process. The problem-conditions or subgoals to which no further inference were possible are identified as problem elements worth noting (called frustration elements hereafter) and analyses are made how these frustrations are resolved in the second inference path. In this process a part of the inference path is extracted which forms one step of inference using the conditions which includes the instructions or new conditions generated by the successive inference from the given instructions.

The afore-mentioned associative knowledge which is stored in the second knowledge-base is basically the same as what has been obtained by generalizing the above extracted part of the inference path such that it can be applied to a similar frustration encountered in other problem, and is automatically obtained by this learning process. The part of the associative knowledge in this invention is the generalized description of the frustration element. The then-part of the associative knowledge comprises the generalized description of the aforementioned conditions which are included in the extracted inference path, which corresponds to the aforementioned auxiliary conditional equation(s) or auxiliary element(s), and the generalized description of the concluding terms of the extracted path or fact(s) newly derived from the concluding terms.

The inference method in the present invention is characterized by the two inference steps to solve a given problem: the first inference step in which the general knowledge stored in the first Kb is used and the second inference step in which the general knowledge stored in the first KB and the associative knowledge stored in the second KB are jointly used when the first inference step fails. The second inference step performs a forward reasoning using the associative knowledge based on the frustration elements identified in the first step. If there is a piece of associative knowledge in the second KB whose if-part matches the frustration element it is possible to generate the then-part of the associative knowledge in the problem space. This new condition(s) which are unable to be obtained in the first inference step makes it possible to further continue inference by the resolution of the frustration.

In the present invention the inference capability is gradually improved as it learns new associative knowledge which is applicable to a similar yet unencountered problem wen the inference succeeded by the introduction of instructions.

The foregoing and other objects, advantages, manners of operation and novel features of the present invention will be understood from the following detailed description when read in connection with the accompanying drawings.

BRIEF DESCRIPTION OF THE DRAWINGS

FIG. 4 is a flowchart showing the details of learning process in FIG. 2.

FIG. 8 is a diagram showing an example of general knowledge.

FIG. 11 is a diagram for explaining the theorem extracted from the proof tree in FIG. 7 to generate associative knowledge corresponding to the frustration element 103 in FIG. 10.

FIG. 12A is a diagram showing an example of the description of the figure constructing information related to the theorem in FIG. 11.

FIG. 12B is a diagram showing a figure pattern which the construction information in FIG. 12A means.

FIGS. 15A and 15B are diagrams showing examples of the representation of the associative knowledge in accordance with the present invention.

FIG. 17 is a diagram for explaining how the associative knowledge obtained already can be applied to a new problem.

DESCRIPTION OF THE PREFERRED EMBODIMENTS

Figure 1:
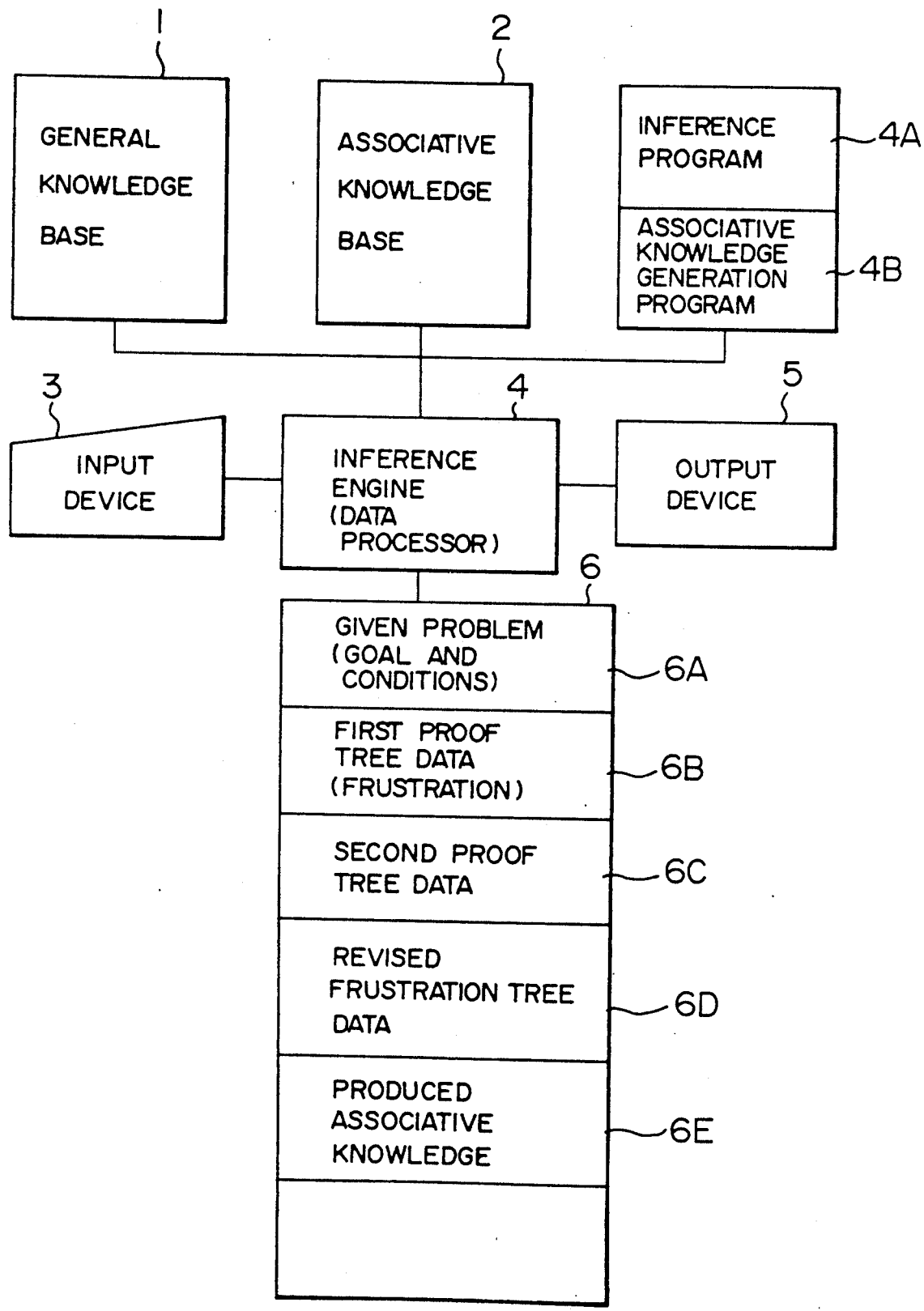
FIG. 1 is a block diagram showing the overall configuration of the inference system according to the present invention.

The embodiments of this invention are explained by referring to the drawings.

FIG. 1 shows in a block diagram a representative configuration of the knowledge-based system of the present invention. Reference numeral 1 denotes a general knowledge-base which stores general knowledge, i.e. domain theory, 2 denotes an associative knowledge-base which stores associative knowledge, 3 denotes an input device like a keyboard by which input the above mentioned two kinds of knowledge and the description of the problem to solve, 5 denotes an output device to output the above mentioned two kinds of knowledge, problem solving process and the final results, etc., and can be an appropriate computer display terminal or printer. 6 denotes a temporary working area to store the problem description given through the input device and temporary data necessary in the course of inference process, and can be a working memory on a computer. Reference numeral 4 denotes an inference engine which solves the problem inputted by the device 1 using the knowledge in 1 and 2, and if not solvable executes the learning mechanism to acquire new associative knowledge in 2, and includes a process which executes the inference program 4A and associative knowledge generation program 4B both of which are stored in the memory. Data are temporarily stored and referred to in the memory 6 during the course of inference processed by the inference engine 4.

Figure 2:
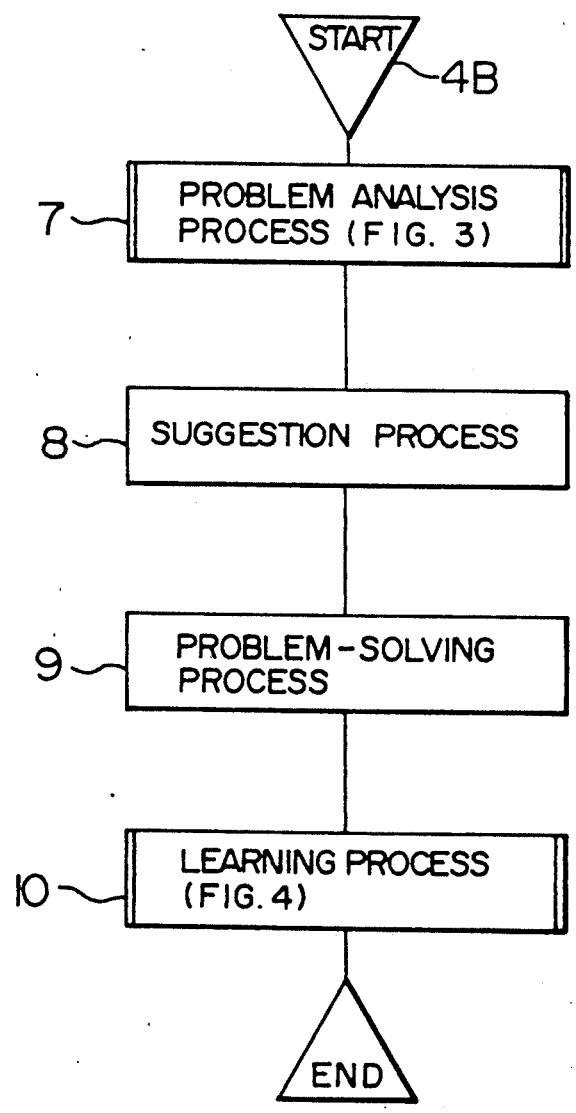
FIG. 2 is a flowchart of the inference process which automatically generates the associative knowledge according to the present invention.

FIG. 2 shows a flowchart which explains the flow of the processes in the program 4B to generate associative knowledge. This program 4B includes the following four processes: problem analysis process 7 in which the inference program 4A runs to solve a given problem by use of the general knowledge and the associative knowledge already stored in the knowledge-bases 1 and 2, and if it cannot solve the problem, the locations where the inference gets stuck are identified and the frustration elements described later are stored, instruction process 8 in which the knowledge lacking to solve the problem is instructed by an expert or a tutor, problem-solving process 9 in which the instructed knowledge is added to the temporary working memory 6 and the problem is solved by use of both the existing knowledge in 1 and 2 and the added knowledge in 6, and learning process 10 in which the results of the analysis in the problem analysis process 7 and the execution results of the problem-solving process are compared and the new associative knowledge to add to the associative knowledge-base is learned.

Figure 3:
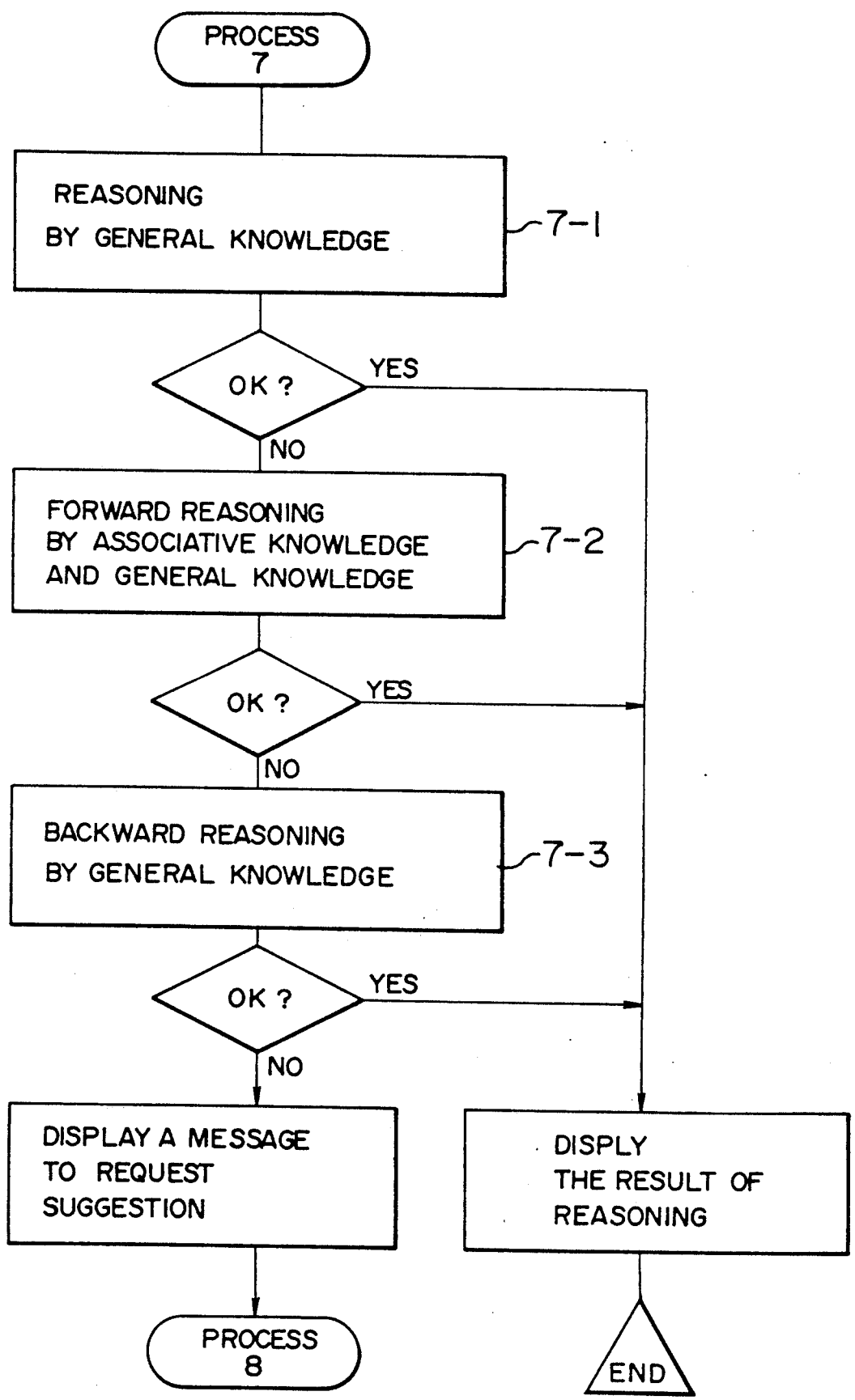
FIG. 3 is a flowchart which shows the details of the problem analysis process 7 in FIG. 2.

The problem analysis process comprises, as shown in FIG. 3, the task 7-1 where a forward and backward reasoning is performed by use of general knowledge, the task 7-2 where a forward reasoning is performed by use of general knowledge and associative knowledge after the inferences stops in the task 7-1, and the task 7-3 where backward reasoning by use of general knowledge is performed after the inferences in the task 7-2 stops.

FIG. 4 shows a flowchart indicating the details of the above-mentioned learning process 10. The learning process includes the following four processes: frustration-analysis process 11 in which the analysis results of the problem analysis process 7 and the results of the problem-solving process are compared, frustration-resolving process 12 in which the analyzed frustrations are resolved, limited reasoning process 13 in which new information is acquired during the course of the frustration resolution, and generalization process 14 in which the knowledge acquired in the process 13 is generalized from problem specific expression to a more general expression.

General explanation of the overall configuration and process flow of the present invention has been given so far. Here, to facilitate understanding of the present invention, specific examples are taken and each step of the processes is explained in detail.

Figure 5A:
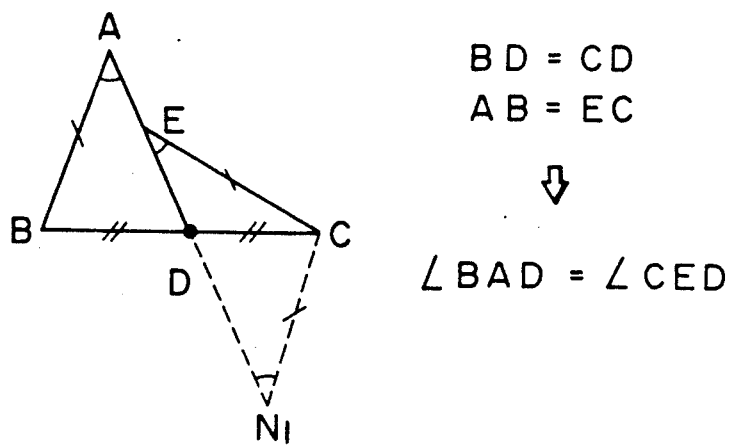
FIGS. 5A and 5B are diagrams for explaining the problems 1 and 2 of the auxiliary-line problem in elementary geometry which are taken as examples to solve by the inference method according to present invention.
Figure 5B:
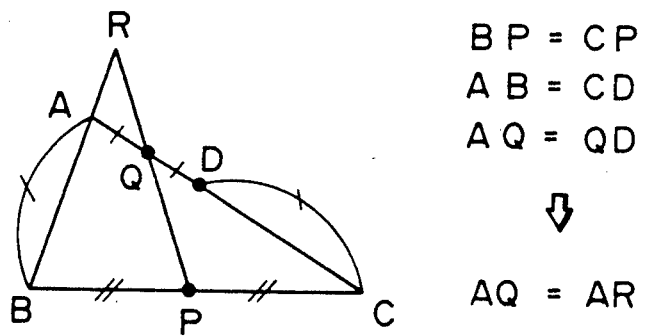

FIGS. 5A and 5B explain sample problems of elementary geometry. FIG. 5A indicates a problem (Problem 1) to prove $\angle BAD = \angle CED$ where BDC is colinear, $BD = CD$ and $AB = EC$ in $\triangle ABD$ and $\triangle EDC$.

FIG. 5B indicates a problem (Problem 2) to prove that $\triangle AQR$ is isosceles, i.e., $AQ = AR$ where P is a midpoint of BC, i.e., $BP = CP$, D is a point taken on AC such that $AB = CD$, Q is a midpoint of AD, i.e., $AQ = QD$ and R is an intersection of the lines extending BA and PQ in $\triangle ABC$.

These problems cannot be solved unless right auxiliary-lines are drawn even if enough knowledge of geometry theorems is provided. Here, drawing auxiliary-lines corresponds to adding a new point or new line segments to the properties given in the problem. The general feature distinguishing each of these from other non-auxiliary line problems in elementary problems is that there lies a discontinuous gap between the goal and given conditions and that there exists some problem elements to which any geometrical basic theorem cannot be applied in either forward or backward directions on both sides of this gap. Producing appropriate auxiliary-lines corresponds to throwing a bridge over the discontinuous gap to find the path to the goal by successive applications of theorems.

Assume that a student was asked to solve Problem 1 and he could not solve it. Further assume that a tutor taught him to plot as a new point the intersection $N_1$ of the line extending AD and the line drawn from C which is parallel to AB. He would then acquire some method of producing auxiliary-line by actually solving this problem. If he is smart and encounters Problem 2 after solving problem 1, he would find a similarity between the two problems and would be able to produce right auxiliary-lines for Problem 2 which is much more difficult to solve that Problem 1.

The reason why he finds a similarity in these two problems is that there are common elements to which he pays deep attention in struggling to solve each. After producing an appropriate auxiliary-line and making a successful proof tree of Problem 2 by making use of the "strategies" acquired from Problem 1, he will recognize the similarity more clearly again and memorization of the strategies will be reinforced as effective ones in his mind. He will become more and more proficient in solving a variety of auxiliary-line problems as he undergoes such experiences many times.

The present invention provides a method for realizing the above learning method of the student by an inference system in a computer, and its principle is based on the assumption that he associates particular problem conditions or a particular subgoal in the problem with a certain chunk of knowledge in a conditioned reflex manner. This chunk of knowledge corresponds to a figure pattern in geometry problem.

In the following, detailed explanation is given of the two geometry problems, but definition of some terms and words is made.

Definition 1 (Geometrical object)

A figure which consists of points and line segments drawn among these segments is called a geometrical object. For example, a point, a segment, and an angle and a triangle are non-dimensional, one-dimensional and two-dimensional geometrical objects, respectively.

Definition 2 (Figure pattern)

A figure consisting of geometrical objects each of which constrains each other is called a figure pattern.

Figure 6:
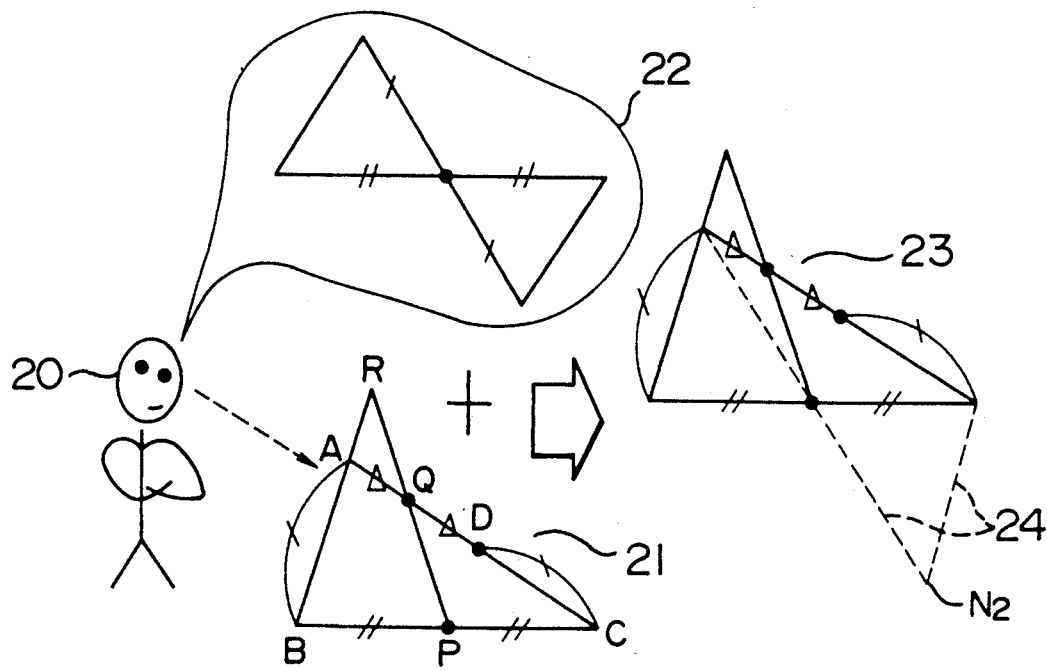
FIG. 6 is a diagram for explaining an association of auxiliary-line in geometry figure.

The associative knowledge for generating auxiliary-lines (hereafter called figure-pattern strategy) is expressed as follows;

IF there exist specific conditions and/or subgoals
THEN recall a certain figure-pattern FIG. 6 shows this basic mechanism by use of a figure-pattern strategy. Suppose that a student 20 happens to pay an attention to the equality condition, $BP = PC$ in figure 21 of Problem 2.

If he has a figure-pattern strategy such as;

IF there exists a condition $(XY = YZ)$
THEN recall a figure-pattern 22 shown in FIG. 6 then auxiliary-lines and a new point $N_2$ suddenly emerge to his eyes as dotted lines 24 by trying to match the pattern 22 to the problem 21 as in figure 23.

This mechanism can be fully automated by a unification technique of logic programming, Prolog, i.e., an inference system or a knowledge-base system using a computer.

First, we must express geometrical information with logical predicates of Prolog. Geometrical information is divided into two types; information for construction geometrical objects and information for constraining relations between constructed objects. Hereafter, these are called "individual information" and "relational information", respectively.

For example, individual information includes information showing the existence of points and lines (segments) and each of them can be expressed with point predicate and line predicate, respectively. Relational information includes the equality relations of two segments or two angles or two ratios between segments, relations that two segments (lines) are parallel to each other and finally relations that two triangles are congruent or similar. Each of them can be expressed with equal predicate, parallel predicate, congruent predicate and similar predicate, respectively.

For example, a point A and a line segment BPC can be expressed as point(a) and line ([b, p, c]), and BP=PC can be expressed as equal (seg (b, p), seg (p, c)). In other words, a problem figure can be represented as an assembly of the assertions whose arguments are instantiated to constants corresponding to the points in the problem.

On the other hand, a figure-pattern strategy can be expressed in the following form as the examples in FIGS. 15A and 15B show;

| IF | ?-condition (a predicate showing a given condition) and/or |
|---|---|
| | ?-subgoal (a predicate showing a subgoal/given goal) |
| THEN | ?-make-pattern (a name of a figure-pattern, list of points concerned) |
| | where |
| | make-pattern (a name of a figure-pattern, list of points concerned):- |
| | (a set of figure-determining information) → |
| | (all the other information of the figure-pattern). |

Figure-determining information (if-part) is the minimum required information for determining the features of the figure-pattern. Therefore, make-pattern predicate works as a macro operator which shows a concrete procedure for recalling a figure-pattern. All the information included in both if-part and then-part of make-pattern amounts to all the futures the figure-pattern has, which is called the figure pattern-information.

We will explain the way of producing auxiliary-line by use of a figure-pattern strategy which we have mentioned in this invention of knowledge-based system. First, the figure-pattern strategy must be selected out whose IF-part matches to a specific problem element (given condition or subgoal), for example BP=PC in Problem 2. And then its THEN-part (make-pattern predicate) is to be invoked, searching for an appropriate set of substitutions between constants in the problem figure and variables in the figure-pattern strategy. An auxiliary-line can be produced by allowing the constant new to match to a variable existing in the figure-pattern strategy during the execution of the predicates or if-part of make-pattern.

We must have two requirements in this search; one is that we must memorize a point new in temporary memory area of the given problem and substitute the point new for one of the variable points which are concerned with executing figure-determining conditions of make-pattern predicate. And the other is that we must given a rule that the call of a predicate in figure-determining conditions always succeeded if it includes a point new as its arguments and then we must memorize the predicate in the temporary memory area of the given problem.

When the call make-pattern predicate ends in success, then the predicates in the if-part of make-pattern which include a point new as their arguments express information determining the locations of a new point and auxiliary-lines, and the predicates in the then-part which include a point new as their arguments express all the new information that holds in the new problem figure after producing auxiliary-lines. In general, there are many successful sets of the substitution by this matching process, each of which corresponds to each of the different auxiliary-lines of theorem proving problem in geometry.

Figure-pattern strategies work for performing a forward reasoning when they are recalled by being invoked by a problem condition, and work for performing a backward reasoning wen recalled by being invoked by a problem subgoal. By employing these figure-pattern strategies, we can have a high possibility of overcoming a gap in the problem, which we could not solve by the previous reasoning methods. The way of producing an auxiliary-line by use of aforementioned figure-pattern strategies is a mechanism general enough to be applied also to other fields of problem-solving. That is to say;

1. A figure-pattern strategy is a kind of associative knowledge. The if-part is a problem element which invokes the association, and the then-part is a procedure which shows the way of the association.

2. The specific element constituting the IF-part of a strategy is a problem element or a subgoal which is a mere partial element in the problem, and so it makes an easy association possible independently of the other elements existing together in the problem, if only there exists the specific element.

From now we will explain in detail, by referring to flowcharts of FIG. 2 through FIG. 4, a series of process of learning figure-pattern strategies as an aforementioned associative knowledge.

Problem Analysis Process 7

When a problem is given from an input device 3, the system tries a problem-proving by use of a general knowledge (for example, a theorem of geometry etc.) stored in Knowledge Base 1 or by use of associative knowledge stored in Knowledge Base 2. Actually, the problem-proving is carried into action by the execution of Inference Program 4A. If the problem is an auxiliary-line problem in which there exists a gap between given conditions and the goal, there sometimes occurs a situation that the system cannot proceed inferences further. In this specification, this state is called a frustration state. A frustration will become an element to be focused on in generating a new associative knowledge (figure-pattern strategies). Those nodes from which the system cannot proceed a forward or backward reasoning further in the proof tree which itself is a process of inference are called frustration elements. There are two kinds of frustration elements. Those nodes at which a forward inference by use of already proved problem conditions cannot be continued further are "frustration conditions". Those nodes at which a backward reasoning for proving the goal cannot be continued are "frustration subgoals".

Figure 7:
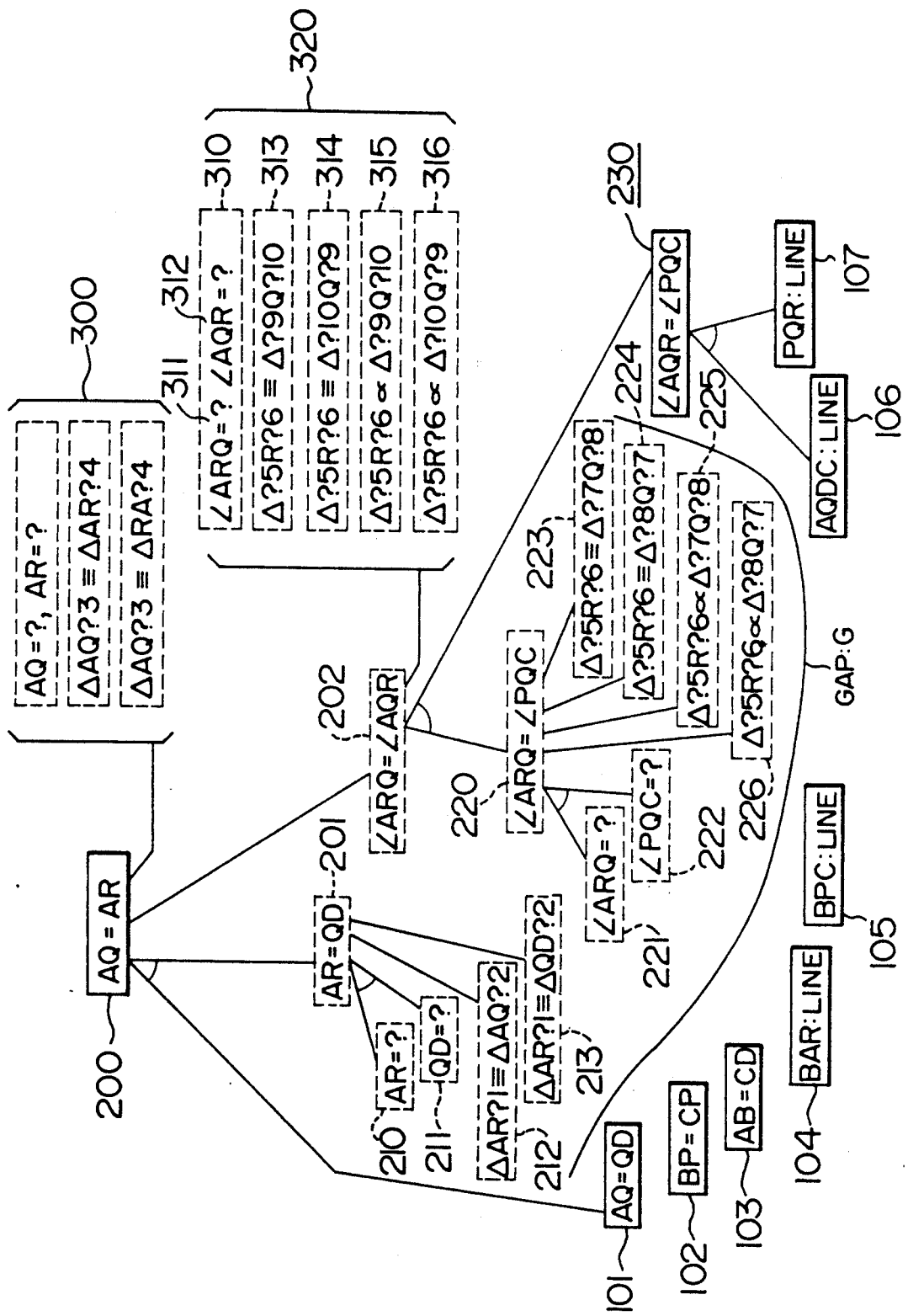
FIG. 7 is a diagram for explaining frustration elements in a proof tree in which the inference gets stuck.

FIG. 7 shows the first proof tree which has been generated in the process of solving the aforementioned problem 2 by carrying out the problem analysis process 7. In this invention, the proof tree which includes several frustration elements that have been obtained if the system cannot solve the problem completely as a result of reasonings is called a frustration tree. In FIG. 7, the nodes 101 through 107 are given conditions and the node 200 is the goal (AQ=AR) to be solved or proved. These were inputted from the input device and have been stored in the given problem area 6A in the working memory 6.

Problem analysis 7 includes three tasks (7-1 through 7-3) as shown in FIG. 3.

Task 7-1

When the problem to be solved (given conditions and the goal in case it is a theorem-proving problem) is given from the input device 3, the system performs a forward reasoning for deducing new relations (conditions) from given conditions by use of general knowledge stored in General Knowledge Base 1 (in this example, theorems about geometry). In FIG. 8, some examples of general knowledge (K1 through K4) are shown. K1 is a theorem about angles accompanied with two lines which intersect at the point Y, K2 a theorem about an isosceles, K3 a general theorem about equality, and K4 a theorem about two congruent triangles.

In FIG. 7, a new condition 230 which shows a relation between two angles at the intersection Q of the two lines is generated as a result of inference by use of the conditions 106 and 107 which show the two lines by applying the theorem K1, and the new condition is appended into the working memory area 6A.

When a forward reasoning stops by use of the knowledge stored in General Knowledge Base 1, the system starts a backward reasoning with width-first search strategy for proving the goal 200. During the backward reasoning with width-first search strategy, several subgoals are generated for providing the goal (or a subgoal) by use of given conditions 101 through 107 and the generated conditions 230 by applying the knowledge in the Knowledge Bases 1 and subsequently a backward reasoning will be performed for each of the generated subgoals. In the example of FIG. 7, in order to prove the goal 200 (AQ=AR), a subgoal 201 (AR=QD) is generated on the basis that the system has now a condition 101 (AQ=QD), according to the theorem K3. In the same way, a subgoal 202 ($\angle$ARG=$\angle$AQR) is generated according to the theorem K2, a subgoal showing that AQ and AR have the same length as the other segment ?, a subgoal showing that the two triangles formed by the segments AQ, AR and other points ?3, ?4 are congruent are generated. In order to prove the subgoal 201, new lower subgoals showing that the segments AR and AQ are of the same length as a segment ? as shown in the node 210 and 211 are generated and new lower subgoals showing that the two triangles $\triangle$AR? and $\triangle$AQ?2 (or $\triangle$QD?2) are congruent as shown in the node 212 and 213 are generated. In order to prove the subgoal 202, a new lower subgoal 220 ($\angle$ARQ=$\angle$PQC) is generated on the basis that the system already has the condition 230 ($\angle$AQR=$\angle$PQC), and other subgoals (310 through 316) written in 320 are generated. These newly generated subgoals which include ? cannot be satisfied by the already existing problem conditions, which results in a failure to continue this backward reasoning. It means that this backward reasoning have not overcome the gap existing between the given conditions and the goal. In the example of FIG. 7, the subgoals generated as a result of this backward reasoning are stored in the working memory area 6A as those to be proved.

Task 7-2

When both backward and forward reasonings stop in task 7-1, the system retries to continue a forward reasoning by applying knowledge stored in Associative Knowledge Base 2 to the frustration elements. In this forward reasoning, the system selects out from the Associative Knowledge Base 2 such associative knowledge (a theorem about a figure-pattern) whose if-part can be matched to the frustration element in the task 7-1, and then generates as new conditions information determining an auxiliary-line which is written in the then-part of this associative knowledge. Also generated is relational information which holds on the above mentioned theorem. The new conditions generated are appended into the working memory area 6A and further forward reasoning will be restarted with depth-first strategy on the basis of these appended conditions and the already existing ones by use of the general knowledge. In this example, we suppose that such associative knowledge is useful to solving the Problem which has not yet been stored in the Associative Knowledge Base 2, so that the system cannot get any new conditions from the execution of this task.

Task 7-3

After generating out all the possible problem conditions in the working memory area 6A in the task 7-2, the system tries to check if some of the subgoals generated in task 7-1 can be matched to the new conditions generated in the task 7-2 and if that there are some, the system subsequently proceeds the backward reasoning further by use of general knowledge stored in Knowledge Base 1. In the example of FIG. 7, the system cannot proceed the backward reasoning any further because we suppose that the system cannot get any new conditions in the task 7-2.

The first proof tree (Frustration tree) generated during the reasoning process in this problem analysis process 7 as shown in FIG. 7 is stored in the working memory area 6B for future use in the learning process 10 which will be executed afterwards.

In case all the reasonings in the task 7-1 through 7-3 end in failure to find a path from given conditions to the goal, a message asking for a suggestion is displayed on the console of the terminal 5 with the given problem (the goal and the given conditions), and the following suggestion process will be executed. On the contrary, if the reasoning ends in success during either task, the result will be displayed and this associative-knowledge-production process 4B ends.

Suggestion Process 8

Figure 9A:
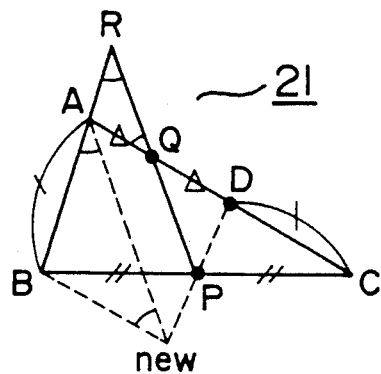
FIG. 9A is a diagram showing instructed auxiliary-lines to solve problem 2.

In this process, the system waits for an operator's inputting such information as useful for solving the above problem from the input device 3 and appends the suggestion information into the working memory area 6A. In case of geometrical problems, the above mentioned suggestion is to be realized by an operator's asserting clauses which determine the location of auxiliary-lines and new points. For example, in Problem 2, a suggestion that a new point should be an intersection between the line extending DP through P and the line parallel to DC passing B (FIG. 9A), can be realized by assertions, such as line ([d, p, new]), parallel (line d, c), line (b, new)) (These correspond to information items 110 and 111 which are marked by the dotted-line rectangles.). They are appended in the working memory area 6A.

Problem-solving process 9

The system performs forward reasonings with a depth-first search strategy b use of the already proved conditions including newly appended conditions, until the system completes constructing a proof tree. During this process, the system tries to generate new conditions subsequently by paying attention to newly appended conditions in every step of the reasoning, by use of the already proven conditions and the knowledge stored in the Knowledge Base 1 and 2. In case of this example of Problem 2, after the two pieces of information 110 and 111 are given in the suggestion process, the system can proceed this forward reasoning in this process 9 as shown in the proof tree of FIG. 9B and ends in succeeding in proving the goal 200. Here, the nodes 240 through 249 are the newly generated conditions in their order of being generated. This proof tree obtained (the second proof tree) is memorized in the working memory area 6C.

Learning Process 10

The information which the system is given in the above mentioned suggestion process is one of the auxiliary-line information in a concrete problem and it is quite different from the associative knowledge (figure-pattern strategy) which the system learns in this learning process 10. In this learning process 10, the system derives out of the second proof tree its portion which has been useful for resolving each frustration element through the following four subprocesses 11 through 14, and then converts it to a figure-pattern strategy which the system can apply in the other reasoning performance afterwards.

Frustration Elements Analysis Process 11

In this process, the two tasks 11-1 through 11-2 are executed.

Task 11-1

First, the system makes up the third proof tree by removing from the first proof tree store in working memory area 6B (frustration tree shown in FIG. 7) the nodes which don't exist in the second proof tree stored in the working memory area 6C (the tree shown in FIG. 9B), and memorize the third proof tree in the working memory area 6D. In case one (for example, the node 201) of the several nodes (for example, the nodes 201 and 101) which are a pair of conjunctive subgoals for proving the upper goal (or subgoal), the connections between the other nodes (for example, the node 101) and the upper goal (or subgoal) are to be canceled. The third proof tree in the above mentioned example consists of the conditions 101 through 107 and the goal 200 and the lower subgoal 202.

Task 11-2

In case the end node on the goal side of the proof tree (in this example, the subgoal 202) is the one which does not include any variables, those frustration subgoals with some variables in them which are connected to the above mentioned subgoal in the first proof tree are appended into the above mentioned third proof tree (in this example, the subgoals 310 through 316).

Figure 10:
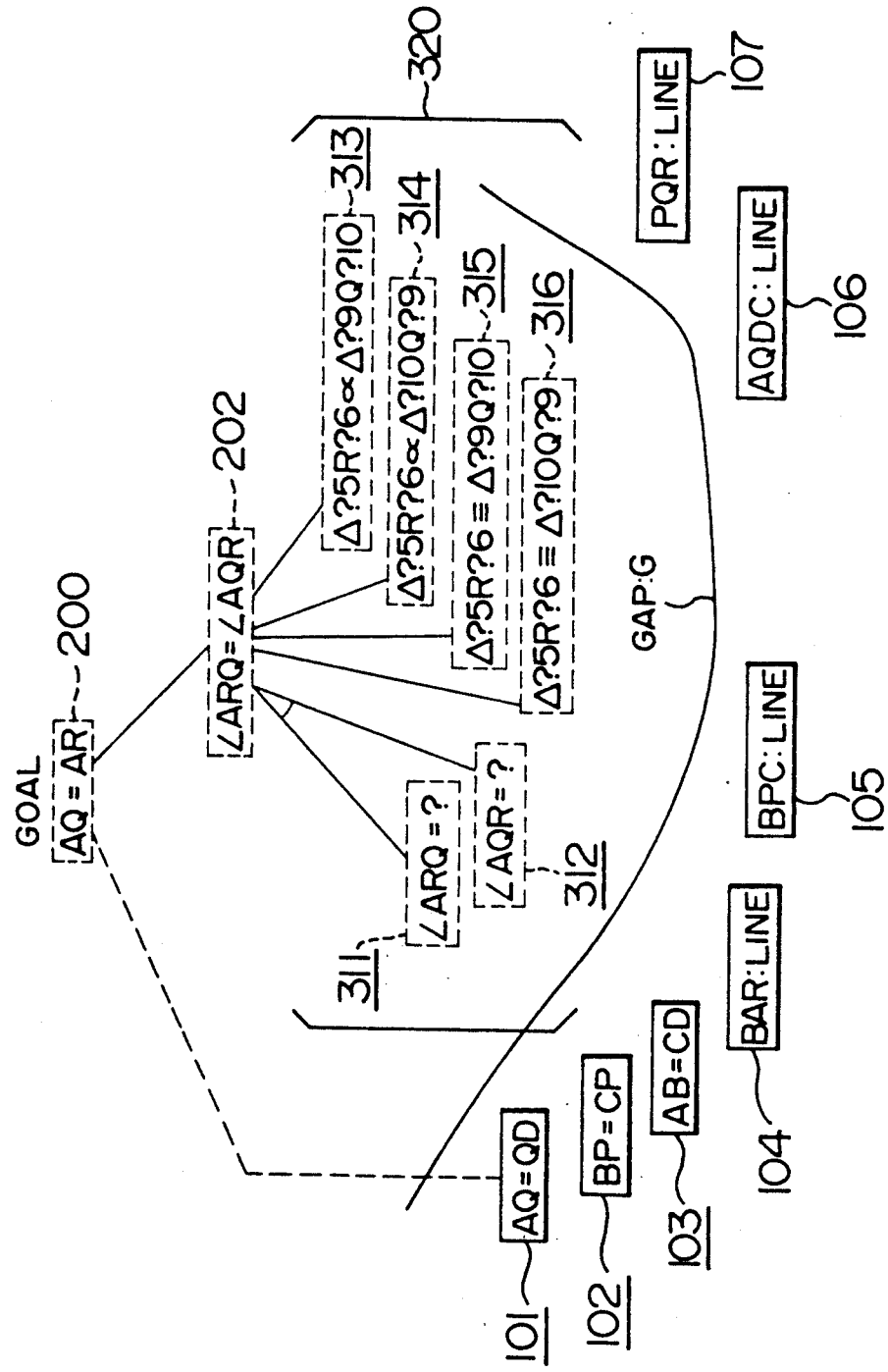
FIG. 10 is a diagram showing a refined frustration tree to automatically generate associative knowledge.

This frustration-elements analysis process is for identifying frustration elements which are in a true sense concerned with completing the proof tree, by comparison between the fist proof tree obtained in the failure to prove the goal and the second proof tree obtained in the success in proving the goal. In this example, the third proof tree obtained in this process 11 (the revised frustration tree) is shown in FIG. 10. Here, the system does not identify the constructing information (the conditions 104 through 107) as frustration conditions, but identifies only the constraining information (the conditions 101 through 103 and the subgoals 311 through 316) as frustration elements.

Frustration Resolving Process 12

In this process, the system derives a frustration element out of the third proof tree (the revised frustration tree) stored in the working memory area 6D one by one, and for each frustration element forms the basic frame of an associative knowledge by executing the following two tasks.

Task 12-1

Figure 9B:
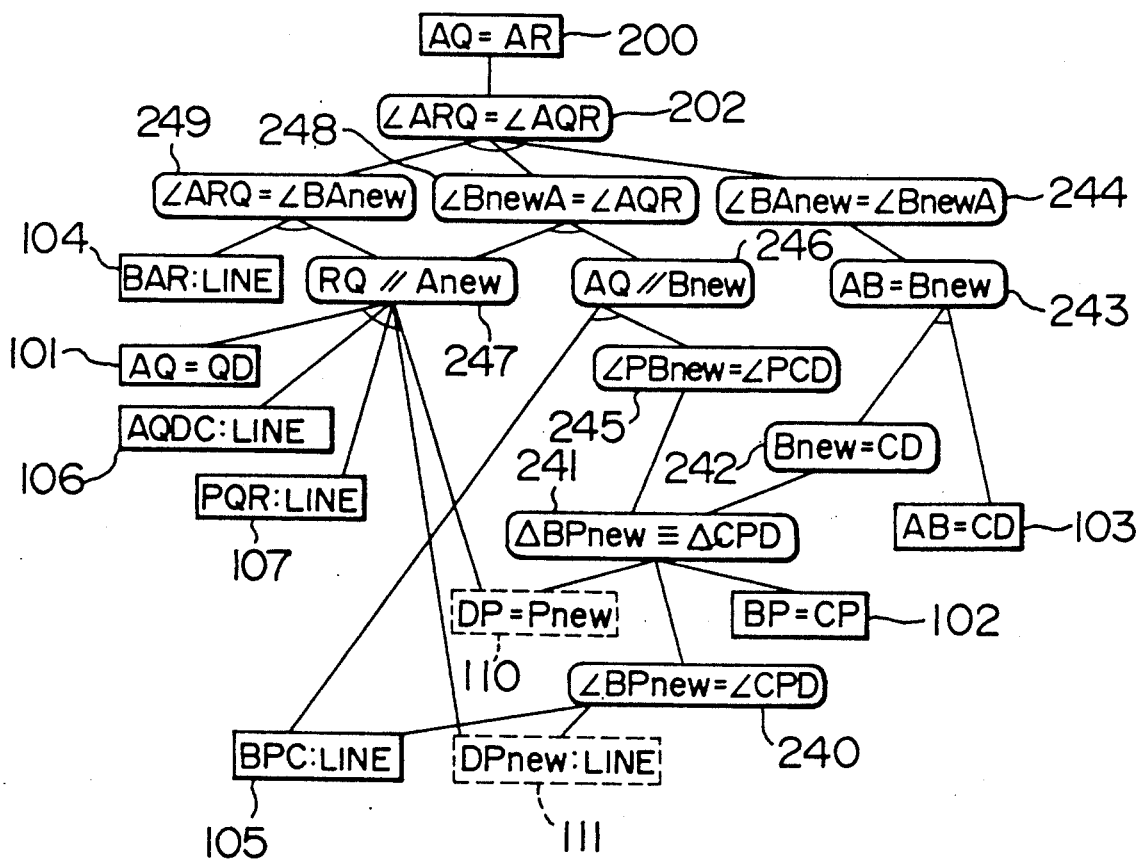
FIG. 9B is a diagram showing a successful proof tree obtained by using the instructed auxiliary-lines.

The system devices from the second proof tree stored in the working memory area 6C the general knowledge (theorem), which has directly contributed to resolving the frustration element, with the constants in the problem remaining in it. The theorem contributing to resolving a frustration condition is the one which includes the condition in its if-part, while the theorem contributing to resolving a frustration subgoal is the one whose then-part is the subgoal. For example, for the frustration subgoal is the one whose then-part is the subgoal. For example, for the frustration condition 102 (BP=PC) included in the third frustration tree (FIG. 10), the theorem shown in FIG. 11 is derived, because the frustration condition 102 is linked to the condition 241 in the second proof tree (FIG. 9B). In the same way, for the frustration condition 101, the theorem consisting of the conditions 101, 106, 107, 110, 111 and 247 in FIG. 9B is derived, the theorem consisting of the conditions 103, 242 and 243 for the frustration condition 103, the theorem consisting of the conditions 104, 247 and 249 for the frustration subgoal 311, the theorem consisting of the conditions 246, 247 and 248 for the frustration subgoal 312 is derived. For the frustration elements 313 through 316 in FIG. 10, no element exists which can be matched to these frustration elements in the second proof tree. It means that they have not been resolved. In that case, the system does not derive a theorem for each of them. These derived theorems are stored in the working memory area 6E in their order.

Task 12-2

The system derives the pieces of constructing information out of the derived theorem in the task 12-1. The constructing information is the point information included in the theorem (point predicate) as well as segment information which is actually drawn among these points in the problem (line predicate). This task is an implementation as a computational operation of the fact that when a frustration has been resolved a figure-pattern made up of the pieces of constructing information which are related to the resolution is recalled. For example, the pieces of constructing information which are concerned with resolving a frustration condition BP=PC 102 are point (b), point (p), point (c), point (d), point (new), line ([b, p, c]), line ([d, p, new]), line ([b, new]), line ([c, d]), as shown in FIG. 12A, and the figure made up of these is shown in FIG. 12B. By executing the above described task for each of the frustration elements, the system can memorize not only the way of resolving the frustration but also the situation where the frustration has been resolved.

Limited Reasoning Process 13

In this subprocess, the system searches by forward reasoning every piece of information which is held within the figure determined in the frustration resolving process 12. In this invention, we call this reasoning "limited reasoning" because the system performs reasonings by use of only the information derived in the process 12 (only within the figure). When it performs limited reasonings in the figure of FIG. 12B, equal (seg (b, new), seg (c, d)) ... (351), equal (ang (b, new, p), ang (c, d, p)) ... (352), equal (ang (new, b, p), ang (d, c, p)) ... (353), parallel (line (b, new), line (c, d)) ... (354) are obtained.

congruent (tri(b, p, d), tri(c, p, new)), equal (seg (b, d), seg (c, new))

cannot be obtained in this limited reasoning because individual information, such as line ([b, d]), line ([c, new]) does not exist.

Figure 13:
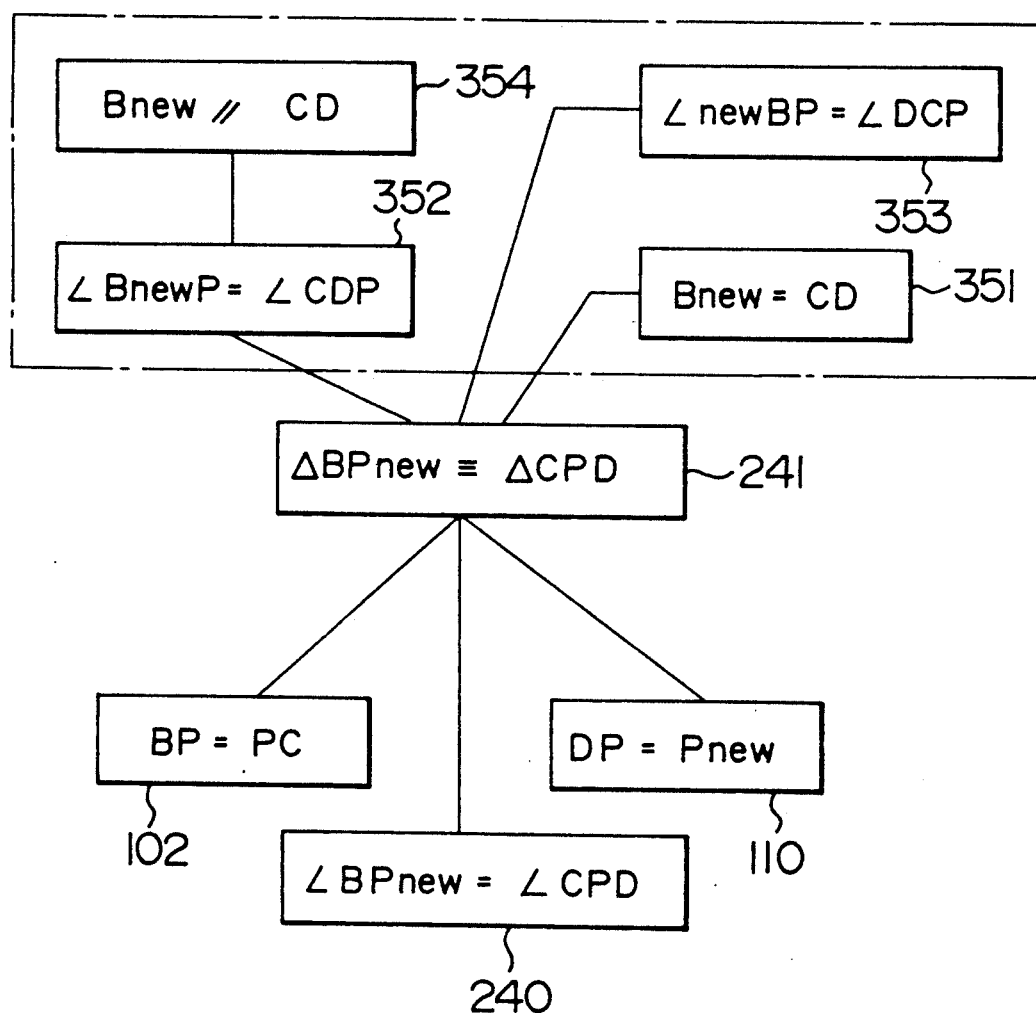
FIG. 13 is a block diagram explaining additional information obtained by the limited forward reasoning to the above theorem.

FIG. 13 shows a theorem stored in the working memory area 6E with all the information obtained in this limited reasoning (351 through 354) appended.

This limited reasoning has the following three significant points although it seems to be a redundant reasoning after making up the complete proof tree in the problem-solving process.

1. To enumerate all the information which the recalled figure-pattern has, including the information which has not contributed to making up the second proof tree is very significant because the information which does not make a contribution (for example, equal (ang (new, b, p), ang (d, c, p))) has a high possibility of being an effective information when this figure-pattern strategy is recalled in the future.

2. To revise the figure-pattern which has been derived in the frustration resolving process, by removing all the constructing information which does not appear in this limited reasoning is very significant in getting a really important figure-shape. We mean by the constructing information which appears in the reasoning the one which is one of the nodes generated during this reasoning or the one which constructs at least one constraining information appearing in the proof tree generated in this reasoning.

3. All the information obtained in the frustration resolving process and the limited reasoning process can determine the way of generalizing the figure-pattern in the following generalization process 14.

Generalization Process 14

Figure 14:
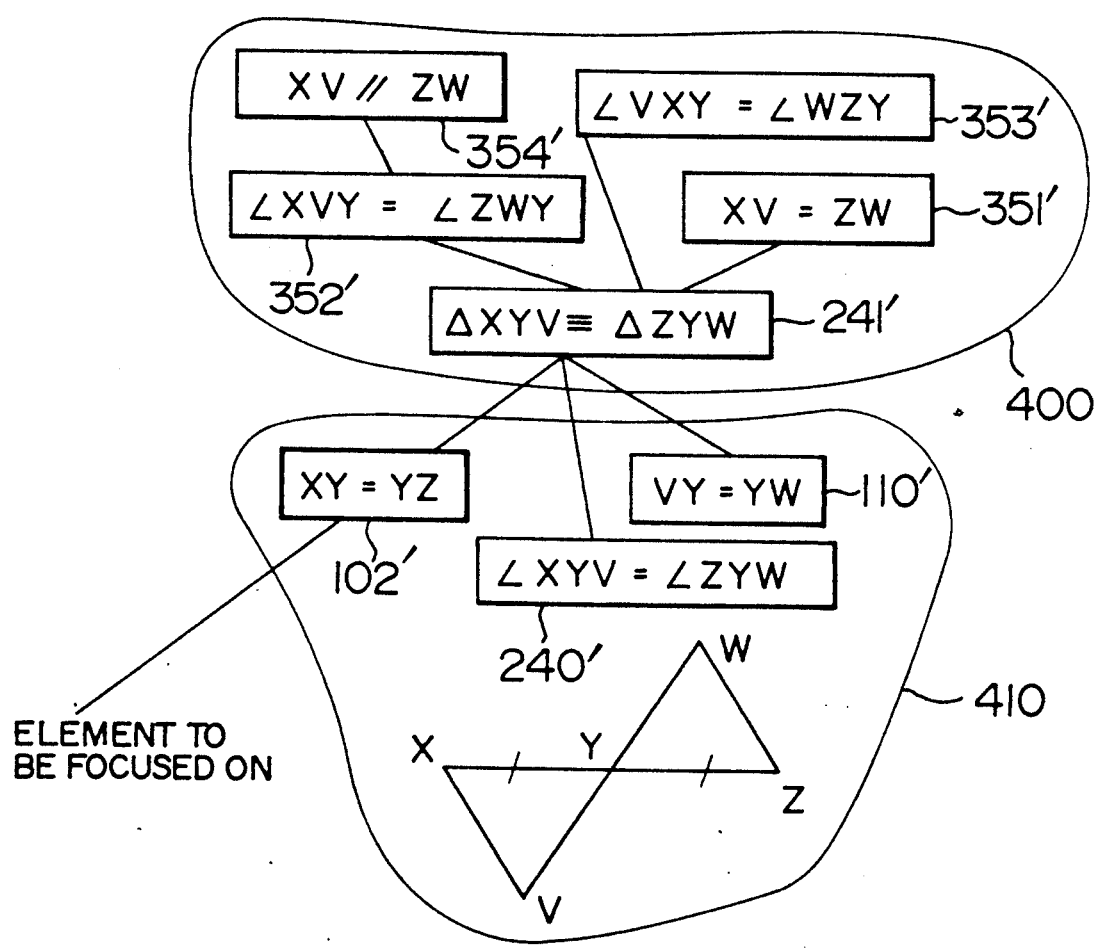
FIG. 14 is a diagram explaining an example of the associative knowledge (figure pattern strategy) generated in accordance with the present invention.

All the pieces of information in the figure obtained in the limited reasoning process 13 are represented by constants in the specific problem. The system needs to generalize it in order to use it as a figure-pattern strategy in figure problems. The method for generalization is basically the same as that in the previous known biography about Explanation-Based Learning; to generalize each node of the proof tree constructed in the limited forward reasoning, with the constraints among variables in the use theorem reserved. A generalized tree of the tree of FIG. 13 is shown in FIG. 14. Out of all the pieces of information, the information 410 is a part of figure-determining information and the information 400 is the remaining one.

We describe the way of forming a figure-pattern strategy. A frustration element which has been a motivation of deriving a figure-pattern constitutes the IF-part of the strategy, and all the generalized information of the figure constitutes the Then-part, make-pattern predicate. The if-part in the body of make-pattern predicate, figure-determining information, is made up of both individual information of the figure-pattern (410) and the body-part of the theorem (general knowledge) extracted in the frustration resolving process 12. The then-part is made up of all the rest information 400. In this way, the system learns a figure-pattern strategy which has in its if-part a frustration element which has been focused on during the problem analysis process and in its then-part a figure-pattern which has been really concerned with resolving the frustration. This learning method reflects the human being's tendency that the more embarrassing some thing is the better they can memorize the situation around it.

FIG. 15A describes in details an associative knowledge S1 (figure-pattern strategy) which has been generated for the frustration element 102 in FIG. 12, an FIG. 15B describes an associative knowledge S2 which has been generated for the frustration element 103.

The system stores in the Associative Knowledge Base 2 the figure-pattern strategies obtained in this way according to the following procedure. In case a pair of the frustration element and all the figure-pattern information can be matched to the pair of the already stored strategy, the system does not store this figure-pattern strategy in the Knowledge Base 2, but increments by one the frequency measure which is prepared for each of the already stored strategies. A frequency measure shows how often the strategy has been used in the past experiences of solving problems, and it can be a measure suggesting the effectiveness of the strategy. Only if a newly obtained strategy cannot be matched to any of the already stored ones, the system stores it in the Associative Knowledge Base 2.

Figure 16:
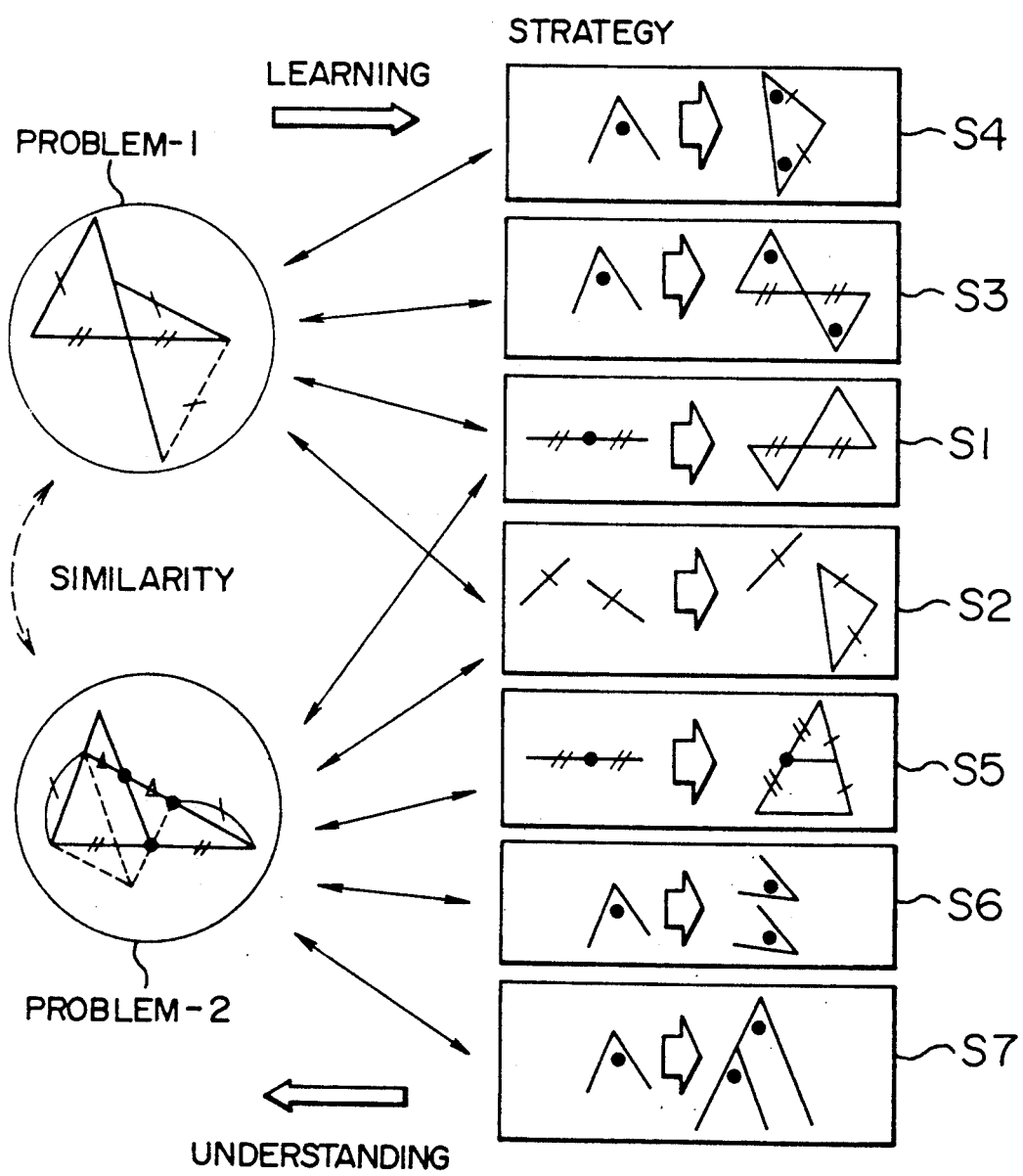
FIG. 16 is a diagram for explaining the relation of the figure pattern strategies obtained by two different problems.

Some examples of acquired figure-pattern strategies in the method of this invention are shown in FIG. 16. In case the system solves Problems 1 and 2 by being given the suggestions shown in FIG. 5A and FIG. 5B, it learns the strategies S1 through S4 from the Problem 1 and S1, S2, and S5 through S7 from the Problem 2, according to this invention. In other words, the system has recognized through Frustration-Based Learning that Problem 1 is composed of four figure-patterns (the figures in the then-part of the strategies) and that Problem 2 is composed of five figure-patterns. When a human being sees these two problems, he finds some similarities between these two problems only because the two strategies S1 and S2 are common in both problems. This fact suggests the effectiveness of the figure-pattern strategy (associative knowledge) generated in the inference system according to this invention.

To summarize solving a problem through Frustration-Based Learning means at the same time understanding it as a composition of figure-patterns each of which is made of pieces of information in the THEN-part of each acquired strategy. Therefore, we can conclude that Frustration-Based Learning in this invention is not only a method for learning associative knowledge, but also can be regarded as a framework for understanding that catches some aspect of human abilities to visualize the overall problem.

The Way of Using New Strategies

We have described how the method of this invention is useful for learning a new strategy in case the system does not have strategies at all. From now on, we will explain how the figure-pattern strategies generated in the past experiences and stored in the associative knowledge Base 2 can be applied to helping prove a new problem. Suppose here that Strategies S1 through S4 have been stored in the Associative Knowledge Base 2 from an experience of the Problem 1 and Strategy S5 from other problems, when Problem 2 is given as a problem to be proved.

According to this invention, the system performs a forward reasoning in the aforementioned task 7-1 resulting in obtaining the conditions 230 in FIG. 7, but the reasoning stops because the system cannot use the constraining information 101 through 103 in the reasoning. And these unused conditions are identified as frustration conditions. But, because the strategy S1 through S5 are stored in the Associative Knowledge Base 2 as a result of learning from the past problems, the system can proceed a reasoning in the task 702 by applying those strategies. It is because, for example, the system can append a new auxiliary-line information in the working memory area 6A, by applying one of the strategies to the frustration condition 102 (BP=PC) in FIG. 7. Here, we describe how the strategy S1 can be applied to the frustration condition BP=PC. PB=PC can be matched to the if-part of the strategy S1 (102 in figure 15A), which results that a variable X in the strategy S1 are substituted by B, y by P, and Z by C. And the then-part of the strategy S1, make-pattern predicate, will be executed. Make-pattern predicate consists of the condition-part and action-part, as mentioned before. During the execution of the condition-part, a new point which should be added by producing an auxiliary-line and the other point already existing in the problem are to substitute the remained variables W and V. As a result of that, if the system appends in the working memory area 6A, as a premise, such predicates in the condition-part of the strategy S1 as include a point new, the are themselves information of showing the location of the auxiliary-lines (110 and 111 in FIG. 9B). A strategy says that the conditions in the action-part hold on the basis that the conditions in the condition-part hold, and so the conditions in the action-part (243 through 354) are appended into the working memory area 6A. Generating these conditions all together results in the saving of a large amount of inference time which would cost the system in the first reasoning process before learning where each of the conditions were generated one by one by a forward reasoning. Performing a series of forward reasonings by use of these newly generated conditions only in the task 7-2 ends in success in obtaining the same proof tree as the one of the FIG. 9B. This suggests the effectiveness of the associative knowledge S1 used. We can get the same effect in the situation where the system uses in the Problem 2 associative knowledge obtained in the Problem 1, as shown in FIG. 16.

In this invention, when the system performs reasoning in the task 7-2 by use of the Associative Knowledge Base 2, it tries to apply as many strategies at the same time as possible. In that situation, if each strategy is stored with each frequency measure, the system can use strategies as higher priority which has a higher score of the measure. The result is shown in FIG. 165. In case the system uses the strategies S1, S2 and S5, three kinds of auxiliary-lines are generated as shown in the rectangle 50. In case of applying the strategy S5 at two places in the problem, one auxiliary-line is generated as shown in the rectangle 51. In case of applying the strategies S1 and S3, one auxiliary-line is generated as shown in the rectangle 52. Out of these auxiliary-lines generated, four in the rectangles 50 and 51 are appropriate lines and the one in the rectangle 52 is the wrong one (which does not contribute to solving the problem).

The embodiments we have shown so far suggests the following characteristics of this invention. This invention has the same effect as the normal knowledge-based system on the kinds of problem which can be solved only by use of the general knowledge given in advance. The system incorporating this invention can solve such problems as cannot be solved only by use of the general knowledge given in advance, if some associative knowledge necessary for solving them have been acquired and stored. And when the system encounters such problems as it cannot solve even by use of both the general knowledge given in advance and associative knowledge, it can generate some new associative knowledge by being given a suggestion, and when the system is given similar problems it will come to solve the problems that cannot be solved by normal knowledge-bases system.

What must be here stressed on is that the associative knowledge learned can have an effect not only on the problem from which this knowledge has been acquired and the problem whose whole problem structure are similar to the original problem but also on the problem only the part of which is similar to the original problem, and such characteristics enable the system to have an ability of association which was impossible by the previous technique.

The explanation of the above described embodiments was based on the premise that the system is given a suggestion in case it cannot solve problems by use of both general knowledge given in advance and associative knowledge. However, in some problems, the system can solve the problems through ineffective brutal search by providing knowledge specific to the problem itself with the general knowledge base. For example, in the auxiliary-line problem in geometry used as an example in this invention, only if the knowledge that a new point is necessary is provided, it is possible for the system to generate such a new point as enables if to use theorems given in the general knowledge base. Although most of the points generated in such a way don't contribute to solving the problem, the system can in some time find out a new point which enables it to solve the problem, an appropriate auxiliary-line. In such a case, if we regard the way as a kind of suggestion, the system can implement exactly the same ability as this invention.

In the above-described embodiments, an auxiliary-line problem in geometry is exemplified as a concrete problem. The knowledge-based system of this invention has a general framework of the knowledge-based system which learns from experiences and automatically increments its ability to have association, and therefore it can be applied to the class of problems which need the ability of association. For example, 1. the problem of pointing out wrong places in a sentence which includes something logically ineducible and reading between lines, 2. the problem of determining the action of robots which are required to take a proper action by having a comprehensive judgement under the situation where there exist only incomplete knowledge and sensor information, can be considered. The form of the general knowledge to be given and the associative knowledge to be acquired is dependent on problems. However, in every case it is common that the system acquires associative knowledge by paying attention to the specific problem elements in the whole problem, indifferently to the whole structure of the problem so that the associative knowledge may be used as a useful knowledge in future problems. This is exactly what this invention intends to achieve.

The embodiments we have shown so far clearly suggests that the knowledge-based system which has an ability of learning associative knowledge according to this invention can acquire and increment lots of associative knowledge necessary for solving future problems as it experiences lots of problems, and come to solve such problems as cannot be solved by use of only the general knowledge given in advance, which will lead to getting over the limitation of the previous techniques.

What is claimed is:

1. An inference system comprising:
   input means for inputting a problem to be solved by inference, said problem including at least one problem condition and/or one goal element;
   a first knowledge base for storing general knowledge for the inference, each of the general knowledge items having an if-part which describes at least one problem condition element and a then-part which describes information holding in case the if-part is satisfied;
   a second knowledge base for storing associative knowledge for the inference, each of the associative knowledge having an if-part which describes at least one problem condition element and a then-part which describes information holding in case both the problem condition element described in the if-part and at least one additional problem condition element are satisfied;
   data processing means for executing an inference action of the problem given through said input means, on the basis of the knowledge stored in said first and second knowledge base; and
   output means for outputting a result of the inference by said data processing means.

2. An inference system according to claim 1, further comprising
   memory means for storing all the information generated in the process of the inference action by said data processing means as well as the problem to be solved which has been inputted through said input means; wherein said data processing means comprising:
   means for executing forward and backward reasoning in the given problem on the basis of the general knowledge stored in said first knowledge base;
   means for executing forward reasoning in the given problem on the basis of the general knowledge stored in said first knowledge base and the associative knowledge stored in said second knowledge base; and
   means for executing backward reasoning in the given problem on the basis of the general knowledge stored in said first knowledge base.

3. A method of inference which is executed in a knowledge based system having a first knowledge base for storing general knowledge which is domain knowledge, a second knowledge base for storing associative knowledge which is different in knowledge structure from general knowledge, an input device for inputting a problem to be solved, and a data processing means for taking an inference action by use of the knowledge stored in said first and second knowledge base for the purpose of solving the problems which have been given through said input device, said method of inference comprising:

a first inference step of executing forward and backward reasoning by use of the general knowledge stored in said first knowledge base, for the purpose of solving the given problems;
   a second inference step of executing forward reasoning for the purpose of solving the given problems by use of the general knowledge stored in said first knowledge base and the associative knowledge stored in said second knowledge base when the inference in the first step comes to stop; and
   a third inference step of executing backward reasoning for the purpose of solving the given problems by use of the general knowledge stored in said first knowledge base when the forward inference in the second step comes to stop.

4. An inference method according to claim 3, wherein,
   said first inference step includes a step for storing a first proof tree which shows the process of the inferences about the given problem, and
   said second inference step executes forward reasoning with a depth-first search strategy for each of the frustration elements included in said first proof tree, by applying the associative knowledge and by use of the general knowledge if necessary.

5. An inference method according to claim 4, wherein the backward reasoning in the third inference step is performed with a breadth-first search strategy.

6. An inference method executed in a knowledge-based system having a first knowledge base for storing the general knowledge which is domain knowledge, a second knowledge base for storing the associative knowledge which is different in knowledge structure from the above mentioned general knowledge, an input device for allowing an operator to input a problem to be solved, a memory means for temporarily storing problem condition elements which construct the problem input from the above mentioned input device, a data processing means for taking inference actions of the input problem by referring to said memory means and said first and second knowledge base, and an output means for outputting a result of the inferences by said data processing means, said inference method comprising:

a first step of reasoning about the given problem by use of the knowledge stored in the first and second knowledge base and storing in said memory information about a first proof tree which shown the process of the inference in the first step;
   a second step of an operator's providing at least one piece of information about additional problem element which is useful for solving the problem from said input means when the reasoning process in the first step is completed, said information about additional problem element being stored in said memory means;
   a third step of reasoning by use of at least the general knowledge stored in the first knowledge base on the basis of the information concerning an additional problem element given in the second step and the information already stored in said memory means and storing in said memory means information about a second proof tree which shows the process of the inference in the second step;
   a fourth step of generating new associative knowledge for at least one frustration element which is included in the information of the first and second proof tree and at which the reasoning processes have stopped in the first proof tree, based on the information about the first and second proof tree stored in said memory means, in case the system succeeds in the inference of the third step, said new associative knowledge defining the relation among the several problem elements which include at least one problem element corresponding to the above mentioned frustration element included in a local path derived out of the second proof tree additional problem element or the other problem element derived by inferences based on it, and a subgoal element derived by inferences based on these elements; and a fifth step of appending said new associative knowledge into said second knowledge base if the same one has not yet been stored in the second knowledge base.

7. An inference method according to claim 6, wherein said fourth step includes a step of converting the relation among several problem elements included in the local path into the generalized form of knowledge representation, whereby new associative knowledge to be stored in the second knowledge base is obtained.

8. An inference method according to claim 6, wherein said fourth step includes:

a step of taking inference actions for deducing at least the other subgoal from the relation among several problem elements included said local path; and a step of converting the relation between several problem elements included in said local path and said subgoal into a generalized form of knowledge representation, whereby new associative knowledge to be stored in the second knowledge base is obtained.

9. An inference method comprising the steps of:

inputting a problem to be solved by inference, said problem including at least one problem condition and/or one goal element;

storing in a first knowledge base general knowledge for the inference, each of the general knowledge items having an if-part which describes at least one problem condition element and a then-part which describes information holding in case the if-part is satisfied;

storing in a second knowledge base associative knowledge items for the inference, each of the associative knowledge items having an if-part which describes at least one problem condition element and a then-part which describes information holding in case both the problem condition element described in the if-part and at least one additional problem condition element are satisfied;

executing in data processing means an inference action of the inputted problem on the basis of the knowledge stored in said first knowledge base and second knowledge base; and outputting a result of the inference from said data processing means.

10. An inference method according to claim 9, further comprising:

storing in memory means all the information generated in the process of the inference action by said data processing means as well as the inputted problem to be solved;

wherein the executing performed by said data processing means includes the steps of:

executing forward and backward reasoning in the given problem on the basis of the general knowledge stored in said first knowledge base;

executing forward reasoning in the given problem on the basis of the general knowledge stored in said first knowledge base and the associative knowledge stored in said second knowledge base; and executing backward reasoning in the given problem on the basis of the general knowledge stored in said first knowledge base.

* * * * *